Patented Oct. 9, 1945

2,386,488

UNITED STATES PATENT OFFICE 2,386,488

PREPARATION OF TRIMETHYLSILICON CHLORIDE

Rob Roy McGregor, Verona, and Earl Leathen Warrick, Pittsburgh, Pa., assignors to Corning Glass Works, Corning, N. Y., a corporation of New York No Drawing. Application September 1, 1943, Serial No. 500,854

2 Claims. (Cl. 260—607)

This invention relates to a new composition of matter and its preparation and, more particularly, to trimethylsilicon chloride and methods of making it.

When a methylmagnesium halide is reacted with silicon tetrachloride, mixtures of methyl silicon chlorides are produced from which the mono- and dimethyl silicon chlorides have been successfully isolated in a pure state. In such reactions presumably some trimethylsilicon chloride must have been present, the amount depending upon the relative concentrations of the reactants and the conditions of the reaction. However, so far as we know, no one has hitherto been able to obtain trimethylsilicon chloride in a pure state from the reaction product of methylmagnesium halide and silicon tetrachloride. Since trimethylsilicon chloride has been found to possess valuable properties as an intermediate in the preparation of commercially useful compositions (as will be described below) it is highly desirable to provide a method of preparing it in a pure condition.

The primary object of this invention is to provide a method of preparing trimethylsilicon chloride in a substantially pure state.

In accordance with this invention, we have provided a method of preparing trimethylsilicon chloride which comprises reacting trimethylethoxysilicane with a phosphorus halide, fractionally distilling the liquid product and recovering the trimethylsilicon chloride boiling at 58° to 58.2° C. at 743 mm.

The preparation of trimethylsilicon chloride was carried out in detail according to the following procedure. Pure trimethylethoxysilicane which was prepared by the reaction of methyl Grignard reagent with dimethyldiethoxysilicane as disclosed in the copending application of W. H. Daudt, Serial No. 500,855, filed September 1, 1943, was dropped onto PCl$_5$, the reactants being in equimolecular proportions. After the initial heat of reaction had been dissipated, the temperature of the mixture was raised to 70° C. and the liquid reaction product distilled into a receiver which was cooled in a dry ice-acetone mixture. The condensate in this tube was then fractionally distilled. The trimethylsilicon chloride was found to have a boiling point of 58°– 58.2° C. at 743 mm. At the same pressure silicon tetrachloride has a boiling point of 57° C. which probably accounts for the fact that previous investigators were unable to isolate trimethylsilicon chloride from mixtures containing silicon tetrachloride. In carrying out the above reaction and in fractionally distilling the product, it is advisable to exclude moisture since the reactants and products hydrolyze in the presence of moisture.

Trimethylsilicon chloride has been found useful as an intermediate in the preparation of organo-silicon copolymers. The hydrolysis products of mono- and/or di-organo-substituted silicanes can be copolymerized with trimethylsilicon chloride to form valuable compositions whose stability is considerably increased owing to the presence of the trimethyl-substituted units. Furthermore, the properties of the resulting copolymer depend upon the amount of trimethyl-substituted material present. It is extremely important that only predetermined amounts of the trisubstituted compound be added and that it be substantially in a pure state since the presence of other materials, particularly other hydrolyzable materials, affect the properties of the product. Accordingly, it is essential to have the trimethylsilicon chloride available in a pure condition. The products obtained by copolymerizing trimethylsilicon chloride with dimethyl silicon dichloride, for example, are thermally stable liquids which are particularly useful as hydraulic fluids and damping media because of their very low viscosity-temperature coefficients and their chemical stability.

We claim:
1. The method of preparing trimethylsilicon chloride which comprises reacting trimethylethoxysilicane with a phosphorus chloride, fractionally distilling the liquid reaction product and recovering the trimethylsilicon chloride.
2. The method of preparing trimethylsilicon chloride which comprises adding trimethylethoxysilicane to phosphorus pentachloride, fractionally distilling the liquid reaction product and recovering trimethylsilicon chloride.

ROB ROY McGREGOR.
EARL LEATHEN WARRICK.